Patented July 14, 1953

2,645,588

UNITED STATES PATENT OFFICE 2,645,588

SILOXANE SILICA COMPOSITION

Arthur J. Barry, Midland, Mich., assignor to Dow Corning Corporation, Midland, Mich., a corporation of Michigan No Drawing. Application March 9, 1950, Serial No. 148,751

2 Claims. (Cl. 106—287)

This invention relates to novel silica gels.

Plastic dielectric compositions composed of a polymeric organosiloxane and a silica aerogel are described in U. S. Patent 2,428,608. These materials have found wide acceptance for sealing spark plug terminals of ignition engines, especially on air craft. The compositions possess a combination of properties not found in any other known dielectric material. Siloxane dielectric compositions containing aerogel fillers have the requisite dielectric strength, thermal stability, water repellency and chemical inertness for use under all conditions of climate encountered by aircraft.

It has been found, however, that siloxane-aerogel dielectrics flow after being subjected to mechanical shear. This is disadvantageous because in many applications it is necessary to apply the dielectric by means of a grease gun. Often after injection into a seal the dielectric compositions will flow out, due to a breakdown in the consistency of the material, caused by the injection process. In addition, flow is often caused by the high vibration encountered in aircraft. The above flow occurs even at 30° C. or below and renders the materials unsuitable for some applications.

It is an object of this invention to provide siloxane silica compositions which do not flow after having been subjected to mechanical shear. Another object is to provide superior siloxane sealing compositions. Another object is to provide siloxane dielectric compositions which may be employed under conditions where no heretofore known material is suitable. Another object is to provide a suitable dielectric containing a lower percentage of $SiO_2$ for any given consistency. Another object is to decrease the cost of preparing siloxane dielectrics. Other objects and advantages will be apparent from the following description.

This invention relates to plastic compositions composed of a fluid organopolysiloxane having a degree of substitution of from 1.9 to 2.1 hydrocarbon radicals per silicon atom, said fluid having a viscosity of at least 50 cs. at 25° C. and from 1 per cent to 35 per cent by weight of $SiO_2$, based upon the weight of the composition.

Such compositions are prepared from a silica hydrogel having from 1 per cent to 35 per cent by weight $SiO_2$, based upon the weight of the gel, by the steps comprising replacing the water in the gel with a water-miscible organic solvent and thereafter replacing the solvent in the gel with the defined siloxane. The resulting siloxaneogel has essentially the same structure as that of the original hydrogel.

Methods of preparing silica hydrogels and of replacing the water therein with an organic solvent to form an organogel are well known in the art. Any method for preparing such gels is suitable for the purpose of this invention, provided the gels obtained thereby are of such a density that they possess the defined per cent by weight $SiO_2$.

Preferably, the hydrogels employed herein are prepared by neutralizing a solution of sodium silicate with an acid and allowing the resulting sol to set to a gel. The gel so formed is preferably broken in pieces of about one inch or less cross section in order to facilitate subsequent liquid interchanges within the gel. Suitable sealing compounds may be prepared without removing the sodium salts from the gel, although the material is usually washed with water until substantially free of ionic materials.

The water is thereafter replaced by washing the hydrogel with a water-miscible solvent. The washing may be carried out in any suitable manner and is continued until essentially all of the water is removed. Suitable solvents are the lower alcohols, ketones, water-miscible ethers and amines.

The solvent is then replaced by the fluid siloxane. In those cases where the water-miscible solvent is also compatible with the siloxane, only one solvent need be employed. In such cases the preparation of the siloxaneogel is carried out in three steps, namely, preparation of a hydrogel, replacement of water with the solvent, and finally replacement of the latter with the siloxane.

In some cases it may be desirable to employ a water-miscible solvent, such as for example ethanol, which is not compatible with the siloxane. Consequently, an additional wash with a siloxane-miscible solvent is needed. Such solvents include, for example, chloroform, carbon tetrachloride, toluene, benzene, ethers, and petroleum ethers. In such a case the preparation involves formation of a hydrogel, replacing the water with a water-miscible solvent, replacement of this solvent in whole or in part with a siloxane-miscible solvent, and replacement of the latter with the siloxane.

Replacement of the solvent with the siloxane may be accomplished by any suitable means, such as by adding the siloxane to the organogel and thereafter distilling the solvent or by washing out the solvent by extraction with the siloxane. It should be understood that in all steps in the manufacture of the compositions of this invention, the liquid component of the gel is removed at below the critical temperature of that liquid.

The materials obtained after removal of the solvent are plastic, jellylike materials having varying consistencies, depending upon the relative proportions of siloxane and $SiO_2$ in the product and the viscosity of the siloxane. The composition may then be milled to improve its uniformity. In case the material is too thick, it may be thinned by adding more siloxane during milling.

The instant compositions differ in their method of preparation from heretofore known silica filled siloxanes in that in the present case the siloxane is added to the silica before removal of the solvent. The unexpected effects gained thereby are stability under mechanical working, as shown by lack of flow and greater economy of the amount of $SiO_2$ required to produce a given consistency.

The siloxanes employed herein are fluids having a viscosity of at least 50 cs. at 25° C. The fluids vary from thin liquids to materials which show little or no flow at room temperature. In those cases where the viscosity of the siloxane is high, say above 30,000 cs., it is often advantageous to add the siloxane to the organogel in the form of a solution. All of the siloxanes employed herein are soluble in organic solvents such as chloroform and benzene.

The siloxanes may be either homopolymers or copolymers. The homopolymers are those in which the siloxane units are $(CH_3)_2SiO$ or $(CH_3)C_6H_5SiO$. The copolymeric siloxanes may contain any combination of the above units and in addition may contain limited amounts of $(C_6H_5)_2SiO$, $RSiO_{3/2}$, and $R_3SiO_{1/2}$ where R is methyl or phenyl. In all cases the siloxanes contain from 1.9 to 2.1 organic radicals per silicon atom, and in all of the siloxanes employed herein, at least 50 per cent of the total organic groups are methyl radicals.

If desired, various suspensoids, such as finely divided silica, $TiO_2$, clay, kaolin, mica, talc, graphite, diatomaceous earth, and fuller's earth, may be added to the compositions of this invention. These materials are preferably introduced into the sol between the time the silicate solution is neutralized and the time the solution sets to the hydrogel. Various pigments may also be added at the same time. By using the above fillers, a more highly filled product may be obtained than is possible by using hydrogel alone.

A further modification of the products of this invention embodies including limited amounts of metallic oxides in the form of cogels with the silica. For the purpose of this invention the preferred oxides are those of iron, copper, titanium, and aluminum. The oxides are employed in amount such that the metal to silicon atomic ratio is less than 0.22 and preferably from .01 to .22.

The inclusion of these oxides tends in some instances to reduce the bleed of the finished dielectric compositions without deleteriously affecting the other desirable properties. This is particularly true when cogels of $SiO_2$ and aluminum oxide are employed, in which case the bleed of the resulting sealing compound is nil.

Cogels of the above oxides and $SiO_2$ may be prepared by adding the desired amount of a soluble salt or a hydrolyzable compound of the metal to a sodium silicate solution and then neutralizing the solution and allowing the sol to gel. The water is then replaced with a water-miscible solvent, which is in turn replaced by the siloxane to give sealing compositions.

The resistance to breakdown due to shear of the compositions of this invention was determined by the test described below, wherein the instant compositions showed essentially no flow, while the previously-known aerogel-filled siloxane compositions failed completely. Hence the compositions of this invention are applicable for use under conditions where no heretofore known dielectric can be employed.

The flow test employed to determine the resistance to shear of the compositions is as follows: The material is worked in accordance with ASTM test D217-44T, whereby a standard plunger is passed through the composition sixty times. A glass tube, 2 cm. by 10 cm. and open at both ends, is then filled with the worked compound. During filling of the tube no air bubbles are introduced. The tube is then hung in a vertical position and allowed to remain twenty-four hours at 30° C. The flow is then expressed as the weight per cent of material which has emerged from the tube.

In this application penetrometer tests both before and after working were conducted in accordance with ASTM 217-44T; arc resistance in accordance with ASTM 495-42; dielectric strength in accordance with ASTM D149-44; and bleed and evaporation in accordance with AN-C-128a.

The products of this invention are useful as sealing dielectrics for ignition systems and for other electrical equipment, for sealing valves, for lubricants and for water proofing of fabrics.

The following examples are illustrative only of the invention.

*Example 1*

Silica hydrogels were prepared from a waterglass solution having the following properties: specific gravity 1.365; 38.35° Bé.; 8.2 per cent $Na_2O$; 26.7 per cent $SiO_2$; calculated formula $Na_2O \cdot 3.36 SiO_2$. This sodium silicate solution was diluted to an 18 per cent by weight solution having a specific gravity of 1.165 by adding 121 parts by volume of water to 100 parts by volume of the silicate solution.

80 parts by volume of the 18 per cent silicate solution was mixed with 20 parts by volume of 37.6 per cent HCl solution and allowed to stand for sixteen hours. The sol thereupon set to a hydrogel containing 13.2 per cent by weight $SiO_2$ based upon the weight of the gel. 500 ml. of the gel was then broken into particles of about one-fourth inch in diameter and washed with water until chloride free. The hydrogel was washed by the batchwise addition of acetone until acetone which had remained in contact with the gel for one hour was essentially anhydrous, as shown by a specific gravity of 0.792 to 0.795. The resulting material was an organogel in which the acetone had replaced the water.

The excess acetone was drained from the gel, and 400 ml. of a 645 cs. copolymeric siloxane having a composition of 5 mol per cent $CH_3SiO_{3/2}$, 90 mol per cent $(CH_3)_2SiO$, and 5 mol per cent $(CH_3)_3SiO_{1/2}$ was added thereto. The mixture was then heated on a steam bath under a water vacuum pump to remove the solvent. The resulting siloxanogel was milled, as 700 ml. more of the siloxane was added. This product was then heated three hours at 100° C. in a vaccum oven to remove traces of acetone.

The resulting compound contained 5.46 per cent by weight $SiO_2$ based on the weight of the composition and possessed the following properties: an initial penetrometer of 25.3 mm. which increased 4.5 mm. after working; a bleed after twenty-four hours at 200° C. of 6.84 per cent by weight; volatile materials lost after twenty-four hours at 200° C. 1.71 per cent by weight; arc resistance 100 sec. to 120 sec.; a dielectric strength in volts per mil of 550; and per cent of flow after working 0.

*Example 2*

Using the procedure of Example 1, the various compositions shown in the table below were prepared. In those runs where two solvents are shown, the first listed was used to replace water and the second to replace the first solvent.

TABLE I

| No. | Amount Hydrogel in ml. | Percent by wt. $SiO_2$ in Hydrogel | Extraction Solvents | Amount Siloxane in ml. | Siloxane, Visc. in cs. at 75° C. | Composition of Siloxane in mol percent | Additional Siloxane added during milling in ml. | Percent by wt. $SiO_2$ in finished product |
|---|---|---|---|---|---|---|---|---|
| 1 | 500 | 6.6 | Acetone | 400 | 500 | $100(CH_3)_2SiO$ | None | 5.03 |
| 2 | 500 | 6.6 | 95% Ethanol $CHCl_3$ | 400 | 500 | $100(CH_3)_2SiO$ | None | 4.27 |
| 3 | 500 | 6.6 | Acetone | 400 | 645 | $\{5CH_3SiO_{3/2}$ $90(CH_3)_2SiO$ $5(CH_3)_3SiO_{1/2}\}$ | None | 4.76 |
| 4 | 500 | 6.6 | Methanol $CH_3Cl_3$ | 400 | 645 | $\{5CH_3SiO_{3/2}$ $90(CH_3)_2SiO$ $5(CH_3)_3SiO_{1/2}\}$ | 200 | 3.53 |
| 5 | 750 | 1.65 | Acetone | 300 | 808 | $\{5CH_3SiO_{3/2}$ $90(CH_3)_2SiO$ $5(CH_3)_3SiO_{1/2}\}$ | None | 2.17 |
| 6 | 750 | 3.3 | do | 315 | 808 | $\{5CH_3SiO_{3/2}$ $90(CH_3)_2SiO$ $5(CH_3)_3SiO_{1/2}\}$ | 50 | 2.43 |
| 7 | 750 | 10.7 | do | 800 | 808 | $\{5CH_3SiO_{3/2}$ $90(CH_3)_2SiO$ $5(CH_3)_3SiO_{1/2}\}$ | 75 | 4.30 |

The properties of the various compositions shown in Table I are recorded in Table II below. For comparison the properties of a siloxane-aerogel dielectric composition of commerce are included.

TABLE II

| No. | Penetrometer in mm. | | After 24 hrs. at 200° C. | | Arc resistance in seconds | Dielectric strength in volts per mil (average of 4 values) | Percent flow after working |
|---|---|---|---|---|---|---|---|
| | Initial | After Working | Bleed in percent by wt. | Volatiles, percent by wt. | | | |
| 1 | 25.7 | 31.0 | 10.1 | 1.57 | 120 and 140 | 380 | 0 |
| 2 | 22.8 | 27.4 | 8.2 | 2.0 | 120 and 125 | 440 | 0 |
| 3 | 18.6 | 20.6 | 3.67 | 1.64 | 100 and 125 | 480 | 0 |
| 4 | 19.3 | 19.8 | 3.33 | 1.37 | 90 and 100 | 340 | 0 |
| 5 | 28.4 | | 10.37 | 0.94 | 150 and 150 | 300 | 0 |
| 6 | 25.5 | 28.1 | 9.18 | 1.10 | 120 and 65 | 350 | 0 |
| 7 | 23.0 | 28 | 7.1 | 1.3 | 170 and 130 | 430 | 0 |
| Siloxane Aerogel Composition | 22.3 | 24.7 | 5.7 | 2.1 | 126 | 828 | 100 |

*Example 3*

Materials which do not flow after working are obtained when a copolymeric siloxane having the composition of 10 mol per cent $(CH_3)_3SiO_{1/2}$, 80 mol per cent $CH_3(C_6H_5)SiO$, and 5 mol per cent $C_6H_5SiO_{3/2}$, and a viscosity of 1000 cs. is employed in the procedure of Example 1.

*Example 4*

A solution of 9 grams of $AlCl_3 \cdot 6H_2O$ and 18.7 cc. of concentrated hydrochloric acid in 200 cc. of water was added to a sodium silicate solution containing 33.3 grams of $SiO_2$. The solution was allowed to stand for twenty-four hours, whereupon it set to a gel. The gel was then washed with water until nearly chloride free, and then with acetone until water free. The acetonogel was then dumped into a flask with 400 cc. of dimethylsiloxane of about 500 cs. viscosity and 50 cc. of chloroform. The mixture was stirred overnight, and the acetone and chloroform were removed by distillation. The resulting siloxanogel was milled with an additional 110 cc. of the siloxane until a uniform product was obtained. The resulting material had an unworked penetrometer reading of 232 mm., a worked penetrometer of 323 mm., and no bleed. The dielectric strength was 486 volts per mill, and the per cent flow after working was .12.

That which is claimed is:

1. A composition of matter having the consistency of grease and consisting essentially of a fluid polysiloxane of at least 50 cs. viscosity at 25° C., said siloxane having from 1.9 to 2.1 hydrocarbon radicals per silicon atom, said radicals being selected from the group consisting of methyl and phenyl radicals, at least 50 per cent thereof being methyl radicals, and from 1 per cent to 35 per cent by weight $SiO_2$ based upon the weight of the composition, said composition having been prepared by the steps comprising replacing the water in a silica hydrogel with a water-miscible organic solvent, and thereafter replacing essentially all of the solvent in the gel with the siloxane.

2. A composition of matter having the consistency of grease and consisting essentially of a fluid polysiloxane of at least 50 cs. viscosity at 25° C., said siloxane having from 1.9 to 2.1 hydrocarbon radicals per silicon atom, said radicals being selected from the group consisting of methyl and phenyl radicals, at least 50 per cent thereof being methyl radicals, from 1 per cent to 35 per cent by weight $SiO_2$ based upon the weight of the composition, and aluminum oxide in amount such that the atomic ratio of aluminum to silicon atoms of the $SiO_2$ is from .01 to 0.22, the aluminum oxide and the silica being in the form of a cogel, said dielectric composition having been prepared by the steps comprising replacing the water in a silica-alumina cogel with a water-miscible organic solvent, and replacing essentially all of the solvent in the gel with the siloxane.

ARTHUR J. BARRY.

References Cited in the file of this patent

UNITED STATES PATENTS

| Number | Name | Date |
|---|---|---|
| 2,441,422 | Krieble et al. | May 11, 1948 |